(12) United States Patent
Ediger

(10) Patent No.: US 11,833,735 B2
(45) Date of Patent: *Dec. 5, 2023

(54) PIPE BELL END RING FLARE SYSTEM AND METHOD OF USE THEREOF

(71) Applicant: Cantex, Inc., Fort Worth, TX (US)

(72) Inventor: Steve D. Ediger, Fort Worth, TX (US)

(73) Assignee: CANTEX, INC., Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/121,077

(22) Filed: Mar. 14, 2023

(65) Prior Publication Data

US 2023/0219279 A1 Jul. 13, 2023

Related U.S. Application Data

(63) Continuation of application No. 16/933,102, filed on Jul. 20, 2020, now Pat. No. 11,628,613.

(51) Int. Cl.
| | |
|---|---|
| B29C 57/04 | (2006.01) |
| B29K 27/06 | (2006.01) |
| B29L 23/00 | (2006.01) |
| F16L 9/12 | (2006.01) |

(52) U.S. Cl.
CPC .......... B29C 57/04 (2013.01); *B29K 2027/06* (2013.01); *B29L 2023/22* (2013.01); *F16L 9/12* (2013.01)

(58) Field of Classification Search
CPC .. B29C 57/04; B29K 2027/06; B29L 2023/22
USPC .................................................... 264/291
See application file for complete search history.

(56) References Cited

U.S. PATENT DOCUMENTS

| | | |
|---|---|---|
| 3,908,579 A | 9/1975 | Miller et al. |
| 4,643,463 A | 2/1987 | Halling et al. |
| D292,308 S | 10/1987 | Beltran |
| 5,222,769 A | 6/1993 | Kaempen |
| D616,966 S | 6/2010 | Angell |
| D631,142 S | 1/2011 | Angell |
| D748,228 S | 1/2016 | Bayyouk et al. |
| D771,480 S | 11/2016 | Lowitz |
| D880,661 S | 4/2020 | Foster et al. |
| 2005/0134044 A1 | 6/2005 | Svetlik |
| 2011/0220238 A1 | 9/2011 | Schnallinger et al. |
| 2022/0016825 A1 | 1/2022 | Ediger |

OTHER PUBLICATIONS

Ex-parte Quayle Action dated Sep. 1, 2022 for corresponding U.S. Appl. No. 29/743,171.
Any information that are not included with this Information Disclosure Statement can be found in U.S. Appl. No. 16/933,102.

*Primary Examiner* — Jeffrey M Wollschlager
*Assistant Examiner* — Xue H Liu
(74) *Attorney, Agent, or Firm* — MILES & STOCKBRIDGE P.C.; David R. Schaffer

(57) ABSTRACT

A pipe bell-end ring flare device for use with a mandrel to form bell ends with a flared outer edge in plastic pipe sections either as part of the pipe manufacturing process or subsequent to the manufacturing process. The flared edge creating a wider bell end opening to make it easier to insert a non-bell end of another pipe into the flared bell end.

23 Claims, 8 Drawing Sheets

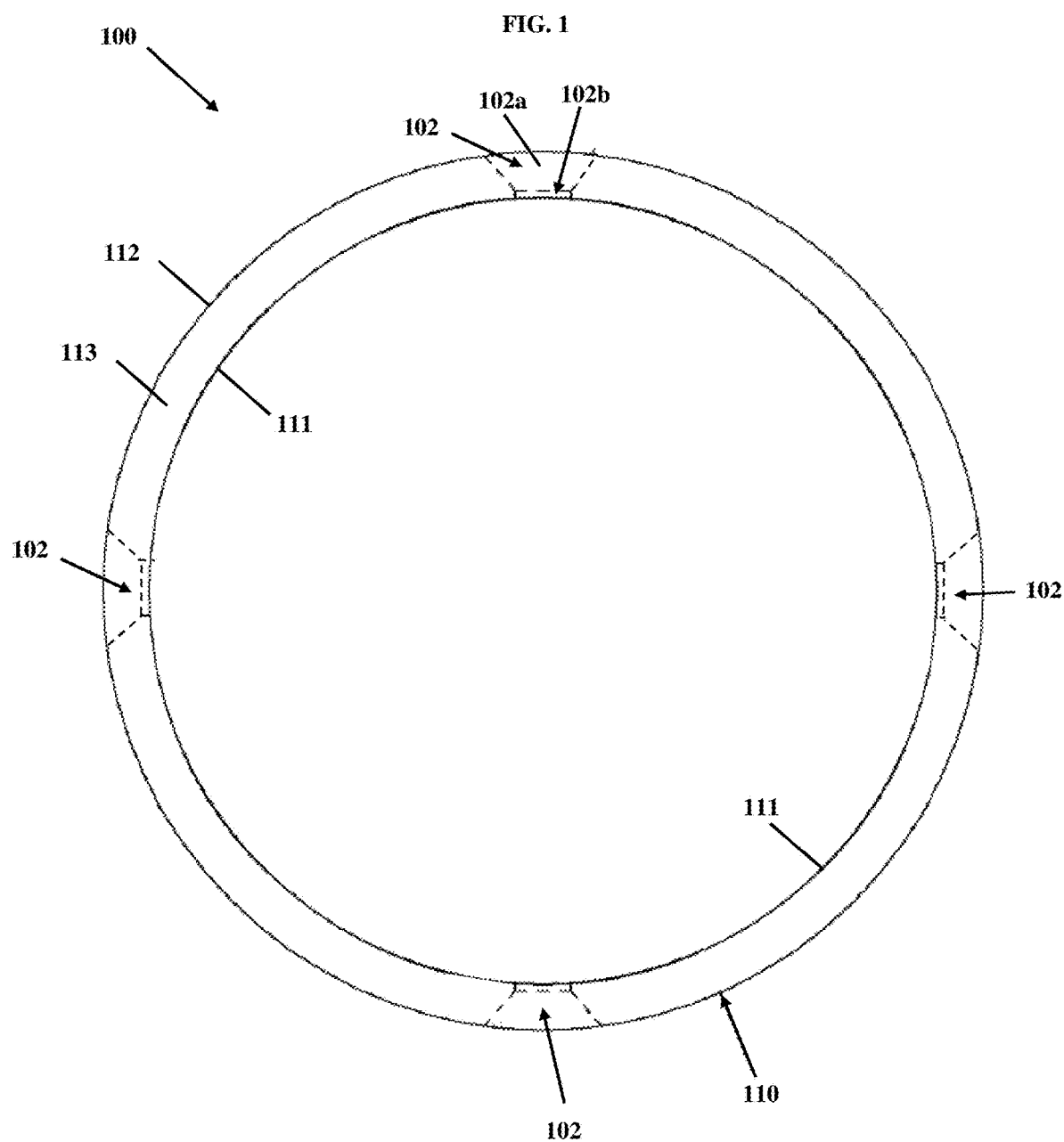

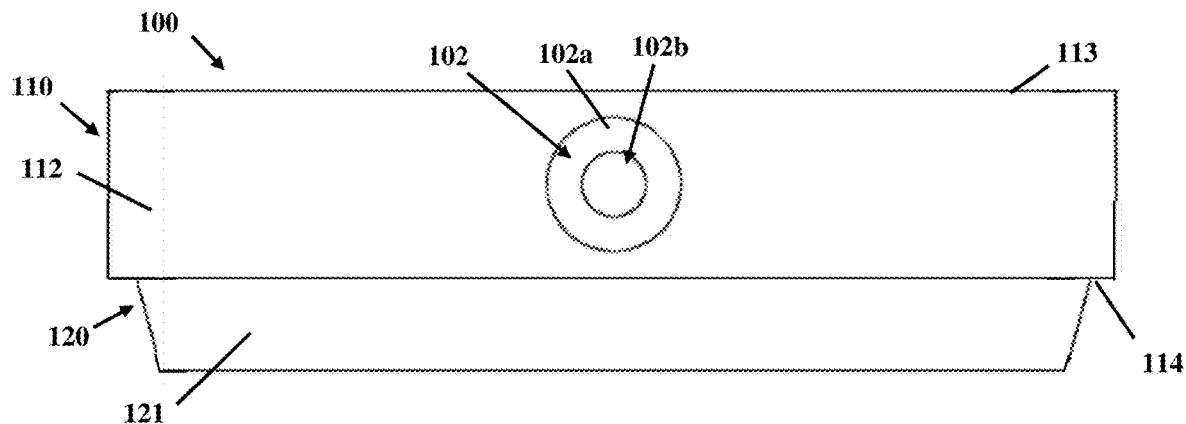
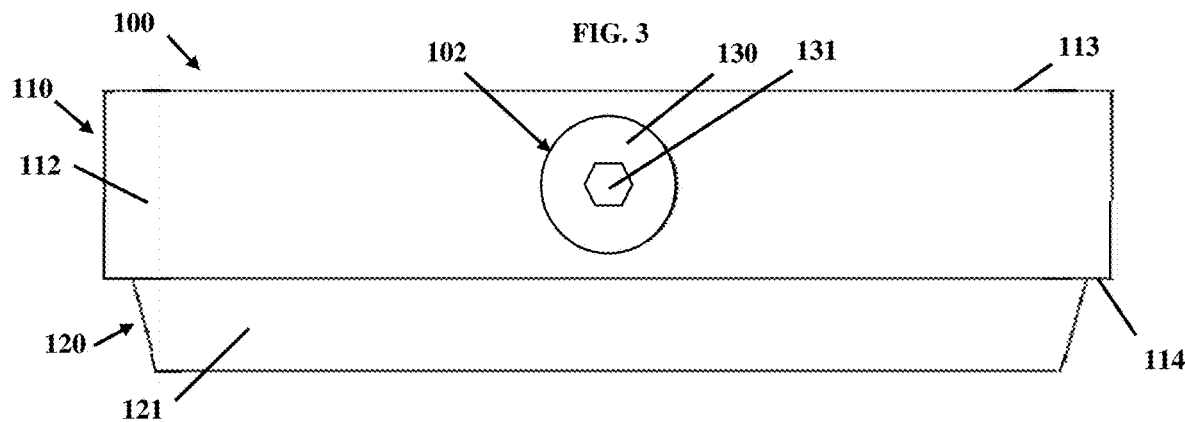
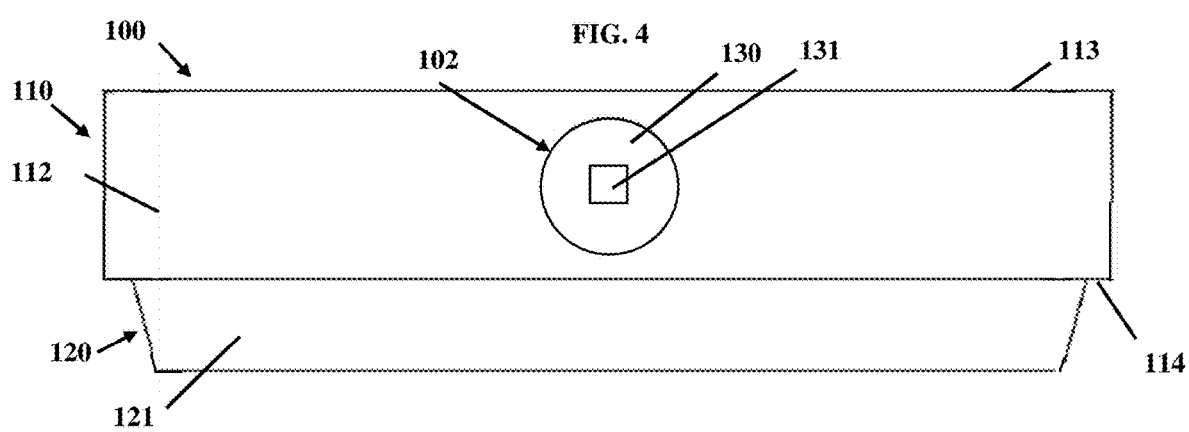

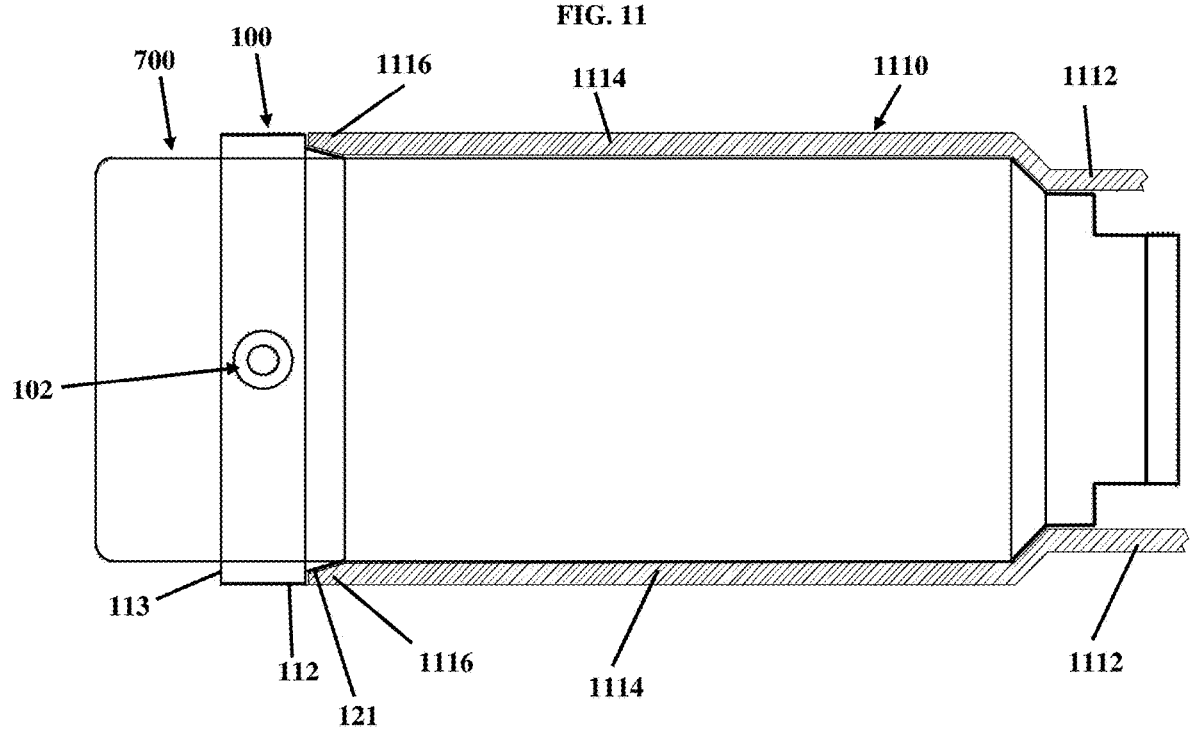

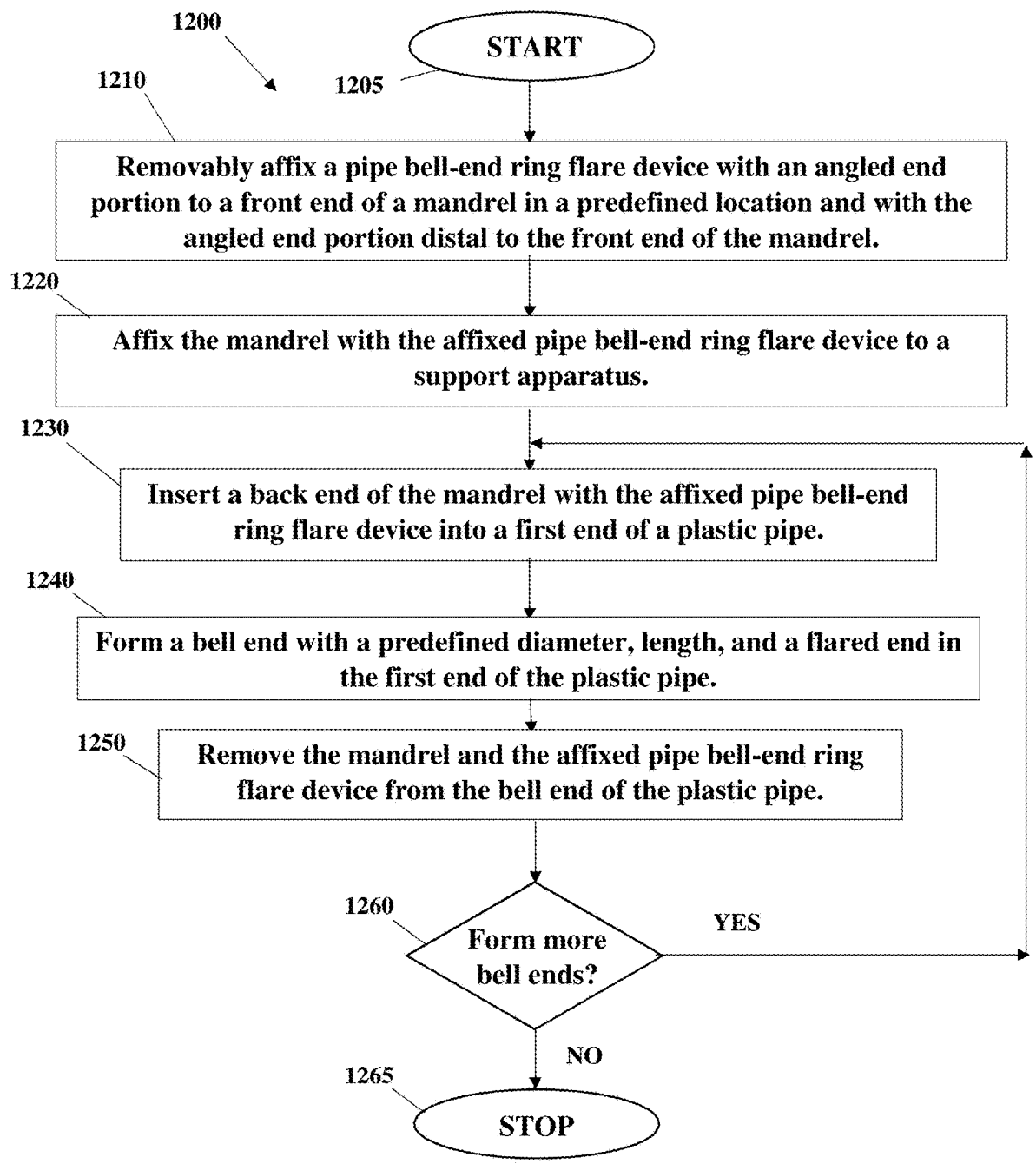

PIPE BELL END RING FLARE SYSTEM AND METHOD OF USE THEREOF

TECHNICAL AREA

Plastic pipe molding tools and more particularly pipe bell-end flare devices that are adapted to connect to a support, for example, a mandrel, for use to create a flared bell end on at least one end of a pipe.

SUMMARY

In various embodiments of the presently disclosed subject matter, a pipe bell-end ring flare device includes: an upper section including an inner circumferential surface being coaxially aligned with and parallel and opposite to an outer circumferential surface, a top surface orthogonal to each of the inner and outer circumferential surfaces and connected at an inner end of the top surface to a top edge of the inner circumferential surface and connected at an outer end of the top surface to a top edge of the outer circumferential surface, the outer circumferential surface depending downwardly away from the top surface and terminating at a bottom edge, the bottom edge of the outer circumferential surface being connected to an outer bottom edge of a bottom surface, the bottom surface extending orthogonally and radially inwardly toward the inner circumferential surface, a plurality of equidistantly spaced recessed fastener openings formed around and through the upper section with a recessed fastener head receiving opening portion each recessed fastener opening being formed in the outer circumferential surface and a coaxially aligned fastener body receiving opening portion being formed in the inner circumferential surface. The device further including a lower section including a bottom portion of the inner circumferential surface forming a continuous and axially aligned extension of the inner circumferential surface of the upper section, the lower section terminating with a bottom edge of the inner circumferential surface, the bottom edge of the inner circumferential surface being connected to a bottom edge of an upwardly and outwardly extending angled outer circumferential lower surface, a top edge of the upwardly and outwardly extending angled outer circumferential lower surface connected to an inner edge of the bottom surface of the upper section.

In another embodiment of the presently disclosed subject matter, an apparatus includes a pipe bell-end ring flare device including: an upper section including an inner circumferential surface being coaxially aligned with and parallel and opposite to an outer circumferential surface, a top surface orthogonal to each of the inner and outer circumferential surfaces and connected at an inner end of the top surface to a top edge of the inner circumferential surface and connected at an outer end of the top surface to a top edge of the outer circumferential surface, the outer circumferential surface depending downwardly away from the top surface and terminating at a bottom edge, the bottom edge of the outer circumferential surface being connected to an outer bottom edge of a bottom surface, the bottom surface extending orthogonally and radially inwardly toward the inner circumferential surface, a plurality of equidistantly spaced recessed fastener openings formed around and through the upper section, each of the plurality of equidistantly spaced recessed fastener openings including a recessed fastener head receiving opening portion formed in the outer circumferential surface and connected to a coaxially aligned fastener body receiving opening portion formed in the inner circumferential surface. The apparatus further includes a lower section including a bottom portion of the inner cylindrical circumferential surface forming a continuous and coaxially aligned extension of the inner circumferential surface of the upper section, the lower section terminating with a bottom edge of the inner circumferential surface, the bottom edge of the inner circumferential surface being connected to a bottom edge of an upwardly and outwardly extending angled outer circumferential lower surface, a top edge of the upwardly and outwardly extending angled outer circumferential lower surface connected to an inner edge of the bottom surface of the upper section. The apparatus further includes a mandrel including a proximal end having a first surface with a first circumference and a plurality of separate, recessed, and threaded openings formed in the first surface of the proximal end and to which the pipe bell-end ring flare device is fixedly and removably attached, a distal end including an end portion having a second surface with a second circumference, and a body portion having a body surface with the first circumference and connected at a first end to the proximal end and at a second end to the distal end.

In another embodiment of the presently disclosed subject matter, a method includes removably affixing a pipe bell-end ring flare device with an angled end portion to a front end of a mandrel in a predefined location and with the angled end portion distal to the front end of the mandrel; affixing the mandrel with the affixed pipe bell-end ring flare device to a support apparatus; inserting a back end of the mandrel with the affixed pipe bell-end ring flare device into an end of a plastic pipe; forming a bell end with a predefined diameter, length, and a flared end; and removing the mandrel and pipe bell-end ring flare device from the bell end of the plastic pipe.

BRIEF DESCRIPTION OF THE DRAWINGS

Non-limiting and non-exhaustive embodiments of the presently disclosed subject matter are described with reference to the following figures, wherein like reference numerals and/or indicia refer to like parts throughout the various views unless otherwise precisely specified.

FIG. 1 is a top plan view of a pipe bell-end ring flare device, in accordance with various embodiments of the disclosed subject matter.

FIG. 2 is a front elevational view of the pipe bell-end ring flare device of FIG. 1, in accordance with various embodiments of the disclosed subject matter.

FIG. 3 is a right side elevational view of the pipe bell-end ring flare device of FIG. 1, in accordance with various embodiments of the disclosed subject matter.

FIG. 4 is a back elevational view of the pipe bell-end ring flare device of FIG. 1, in accordance with various embodiments of the disclosed subject matter.

FIG. 11 is a side view of FIG. 7 showing the pipe bell-end ring flare device installed around a front end of the mandrel with a partial section of a pipe bell end shown around the mandrel, in accordance with various embodiments of the disclosed subject matter.

FIG. 12 is a flowchart describing the method of using the pipe bell-end ring flare device when installed around a front end of the mandrel to create a pipe bell end with a flared end, in accordance with various embodiments of the disclosed subject matter.

DETAILED DESCRIPTION

Figure 5:
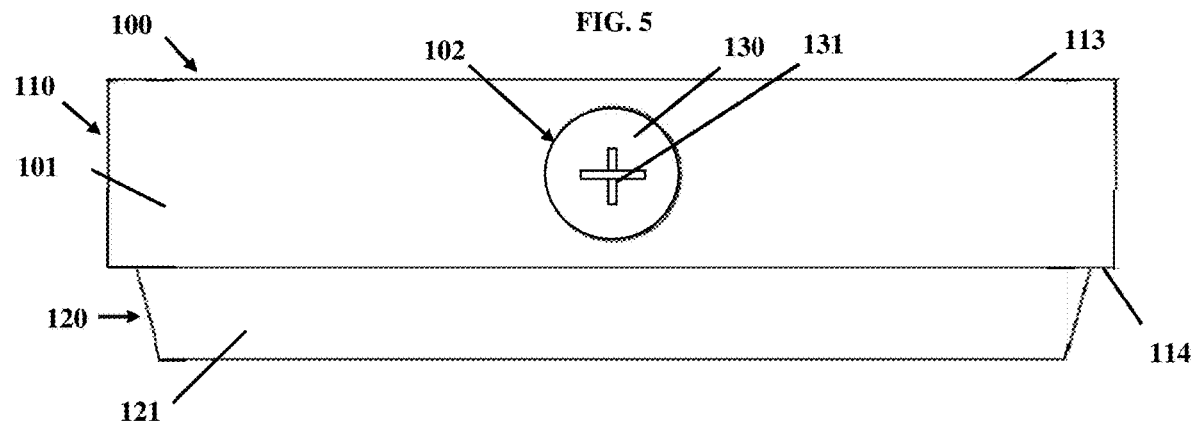
FIG. 5 is a left side elevational view of the pipe bell-end ring flare device of FIG. 1, in accordance with various embodiments of the disclosed subject matter.

FIG. 1 is a top plan view of a pipe bell-end ring flare device 100, in accordance with various embodiments of the disclosed subject matter. In FIG. 1, the pipe bell-end ring flare device 100 has a cylindrical ring shape and can include multiple recessed fastener openings 102 formed through the pipe bell-end ring flare device 100. Each of the multiple recessed fastener openings 102 has a larger cone-shaped recessed fastener head receiving opening portion 102*a* formed in an outer circumferential surface 112 that connects to a short cylindrical fastener body opening portion 102*b* that extends through and forms an opening in an inner circumferential surface 111 of the pipe bell-end ring flare device 100. A top surface 113 is connected between top edges of the outer circumferential surface 112 and the inner circumferential surface 111. While the embodiment in FIG. 1 shows four equally-spaced recessed fastener, for example, but not limited to, four (4) equally-spaced recessed screw openings 102, other embodiments can include 2, 3, or 5 or more screw openings 102, but regardless of the number, in general, they are equally-spaced from each other around the pipe bell-end ring flare device 100 to prevent uneven shifting of the pipe bell-end ring flare device 100 when in use, as will be described herein, which will result in uneven, malformed, or incomplete flared bell pipe ends.

FIG. 2 is a front elevational view of the pipe bell-end ring flare device 100 of FIG. 1, in accordance with various embodiments of the disclosed subject matter. In FIG. 2, the pipe bell-end ring flare device 100 is shown to have two contiguous portions, a top portion 110 and a lower portion 120. The outer circumferential surface 112 forms the outside surface of the top portion 110 and extends downwardly and away from the top surface 113 at a orthogonal angle and a bottom edge of the outer circumferential surface 112 connects at a orthogonal angle to an outside edge of a bottom surface 114 of the top portion 110. The bottom surface 114 extends radially inwardly away from the outer circumferential surface 112 and an inner edge thereof connects to a top edge of a downwardly and inwardly extending angled outer circumferential surface 121 of the lower portion 120. The downwardly and inwardly extending angled outer circumferential surface 121 angles away from the bottom surface 114 at angles between about 115°-125° and, in at least one embodiment, the angle is about 120°. The inner circumferential surface 111 depends orthogonally downwardly away from an inner edge of the top surface 113 and forms the inner wall of the both the top portion 110 and the bottom portion 120. A bottom edge of the inner circumferential surface 111 connects to a bottom edge of the downwardly and inwardly extending angled outer circumferential surface 121 at angel of about 25°-35° and, in the at least one 120° described above, at an angle of about 30°.

In FIG. 2, one of the multiple recessed fastener openings 102 is shown formed in the face of the outer circumferential surface 112 without a fastener being inserted therein. In addition, in FIG. 2, the fastener body opening portion 102*b* is coaxially aligned with the recessed fastener head receiving opening portion 102*a*.

FIG. 3 is a right side elevational view of the pipe bell-end ring flare device 100 of FIG. 1, in accordance with various embodiments of the disclosed subject matter. In FIG. 3, a threaded fastening device 130, for example, but not limited to, a screw 130, is shown, or more accurately, a top of a head of the screw 130 is shown positioned in another one of the multiple recessed fastener openings 102. Each threaded fastening device 130 has a conical head with a flat top that is adapted to seat into the multiple recessed fastener openings 102 so that the flat top is flush with or below the outer circumferential surface 112. The screw 130 has a hexagonal-shaped opening 131 formed in the top of the head of the screw 130, which would require a hexagonal-shaped driver, for example, but not limited to, an Allan wrench, to install and remove the screw 130.

FIG. 4 is a back elevational view of the pipe bell-end ring flare device 100 of FIG. 1, in accordance with various embodiments of the disclosed subject matter. In FIG. 4, the screw 130 is shown, or more accurately, the top of the head of the screw 130 is shown positioned in another one of the multiple recessed fastener openings 102. The screw 130 has a square-shaped opening 131 formed in the top of the head of the screw 130, which would require a square-shaped driver to install and remove the screw 130.

FIG. 5 is a left side elevational view of the pipe bell-end ring flare device 100 of FIG. 1, in accordance with various embodiments of the disclosed subject matter. In FIG. 5, the screw 130 is shown, or more accurately, the top of the head of the screw 130 is shown positioned in still another one of the multiple recessed fastener openings 102. The screw 130 has a plus sign-shaped opening 131 formed in the top of the head of the screw 130, which would require a plus sign-shaped driver, for example, but not limited to, a Phillips-head screwdriver, to install and remove the screw 130. Alternatively, although not shown, the head of the screw 130 can have a single slot for a standard screwdriver.

It should be understood that the screw head driver formations shown in FIGS. 3, 4, and 5 and described above merely illustrate some possible configurations and that additional screw head opening 131 configurations are possible, for example, but not limited to, a star shape, a triangle shape, a semi-circle, a pentagonal shape, etc.

Figure 6:
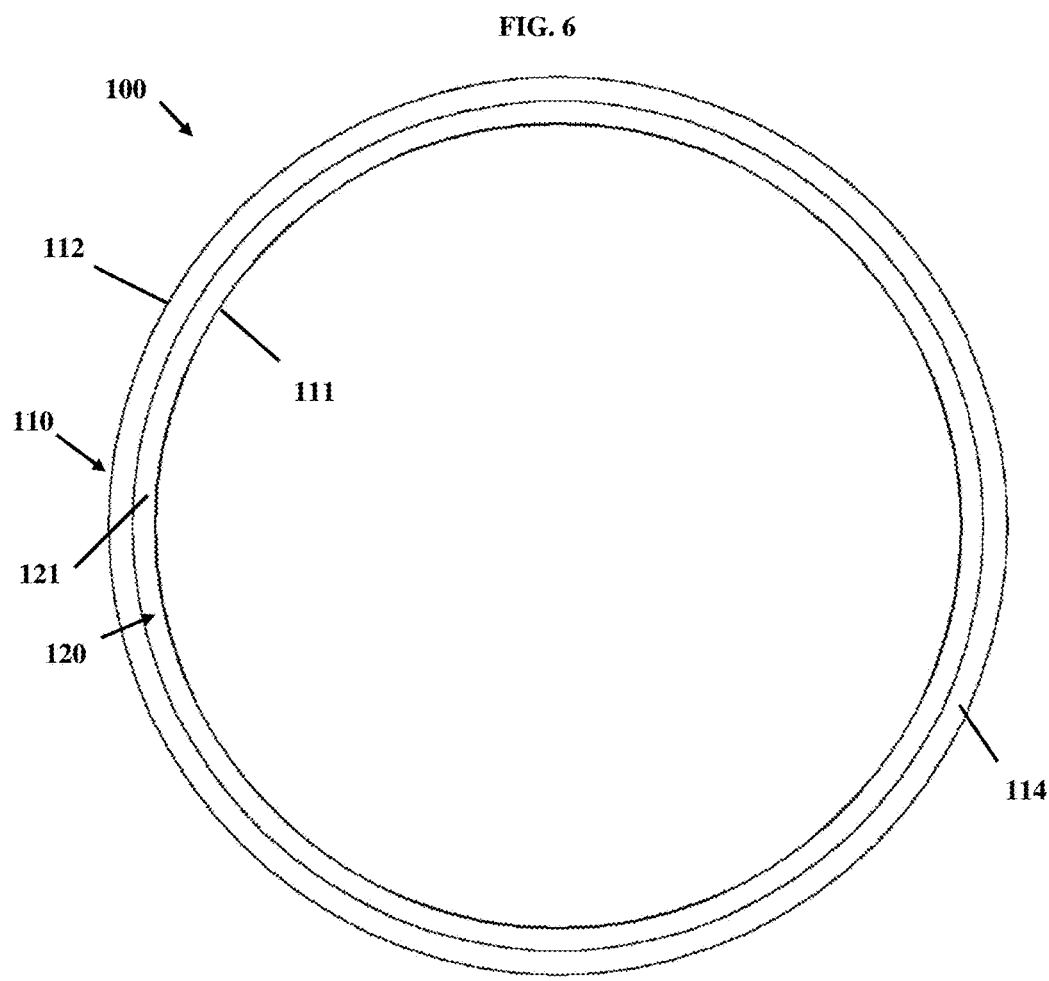
FIG. 6 is a bottom plan view of the pipe bell-end ring flare device of FIG. 1, in accordance with various embodiments of the disclosed subject matter.

FIG. 6 is a bottom plan view of the pipe bell-end ring flare device 100 of FIG. 1, in accordance with various embodiments of the disclosed subject matter. In FIG. 6, the orientation of the lower portion 120 is shown to extend away from an inner circumferential edge of the bottom surface 114 of the outer circumferential surface 112. Specifically, the downwardly and inwardly extending angled outer circumferential surface 121 angles away from the bottom surface 114 at about a 115°-125° angle including, for example, a 120° angle until it ends and connects to the bottom edge of the inner circumferential surface 111.

Figure 7:
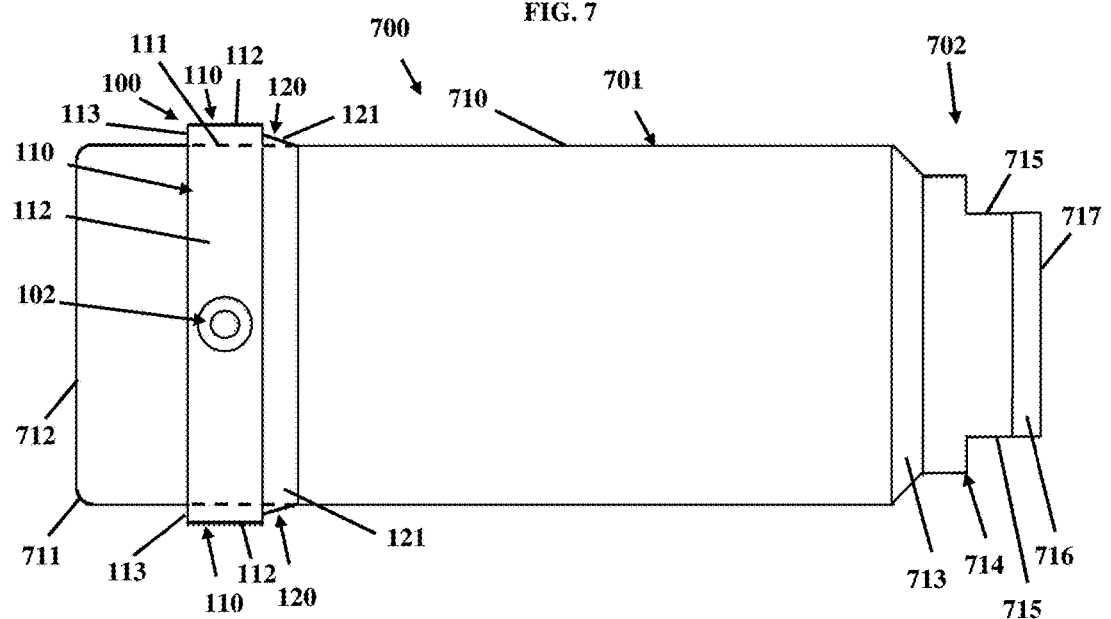
FIG. 7 is a side view of the pipe bell-end ring flare device of FIG. 1 installed around and connected to a mandrel, in accordance with various embodiments of the disclosed subject matter.

FIG. 7 is a side view of the pipe bell-end ring flare device 100 of FIG. 1 installed around and connected to a mandrel 700, in accordance with various embodiments of the disclosed subject matter. In FIG. 7, the pipe bell-end ring flare device 100 is shown installed around and adjacent to a top end of a mandrel 700. The mandrel 700 has a main body portion 701 with a cylindrical outer circumferential surface 710, and a bottom body portion 702, which has a step-shaped configuration. The cylindrical outer circumferential surface 710 of the main body portion 701 is connected to a top end 712 by a rounded corner portion 711. Although not shown in FIG. 7, the cylindrical outer circumferential surface 710 of the main body portion 701 includes four (4) equally-spaced threaded openings 703 (see FIG. 8) located around the main body portion 701 and adjacent to the top end 712. These threaded openings 703 are spaced and adapted to align with the multiple recessed fastener openings 102 in the pipe bell-end ring flare device 100 and each of the threaded openings 703 is adapted to receive one of the threaded fastening devices 130.

In FIG. 7, the bottom body portion 702 includes an angled portion 713 that connects at a top end of the angled portion 713 and angles radially inwardly to connect at a bottom end to a top end of a base portion 714. The base portion 714 is connected at a top end to the angled portion 713 and includes two parallel cutout sections defined by walls 715, a chamfered end portion 716 with a bottom end 717, and a center drill opening 718 formed in the bottom end 717. The base portion 714 has a generally circumferential configuration with the two parallel walls 715 providing gripping surfaces for a wrench or other turning tool.

Figure 8:
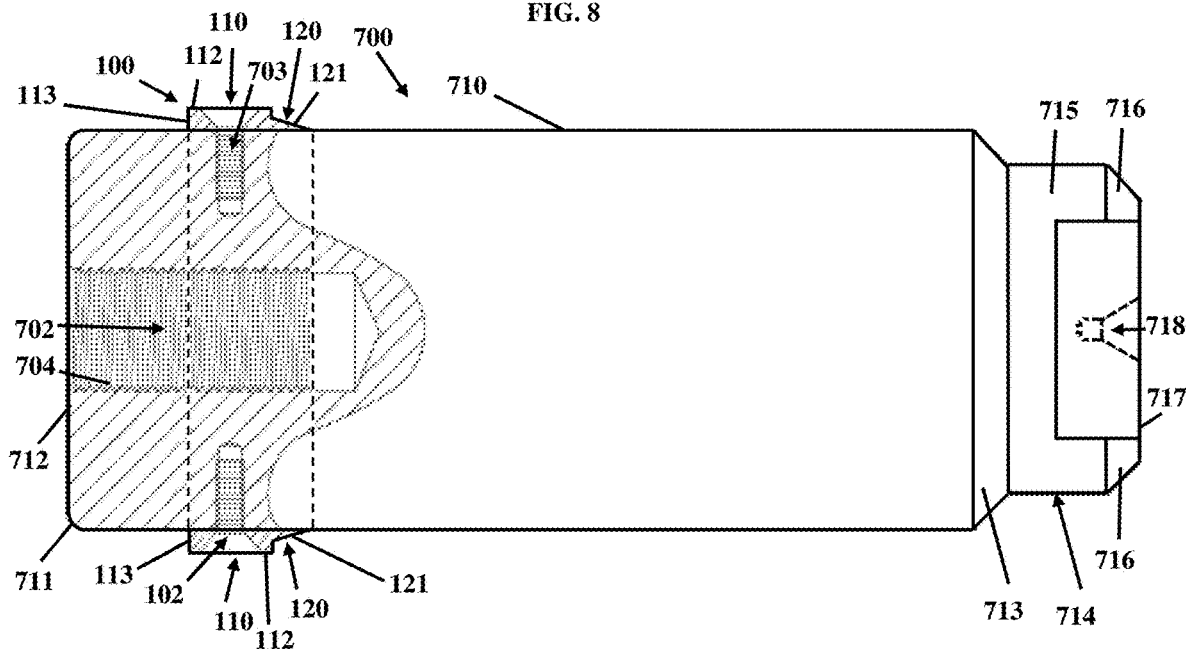
FIG. 8 is a side view with a partial cross-sectional view of the pipe bell-end ring flare device installed around and connected to the mandrel of FIG. 7 rotated by 90°, in accordance with various embodiments of the disclosed subject matter.

FIG. 8 is a side view with a partial cross-sectional view of the pipe bell-end ring flare device 100 installed around and connected to the mandrel 700 of FIG. 7 rotated by 90 degrees, in accordance with various embodiments of the disclosed subject matter. In FIG. 8, two of the equally-spaced threaded openings 703 are shown in cross-section extending radially inwardly into the mandrel 700 and in line with two of the recessed fastener openings 102 in the pipe bell-end ring flare device 100. A mandrel opening 702 is formed in the top end 712 of the mandrel 700 and the mandrel opening 702 is coaxially aligned along a longitudinal axis of the mandrel 700 and includes a threaded internal surface 704. The mandrel opening 702 and drill opening 718 are used together to center the mandrel 700 and the pipe bell-end ring flare device 100 in a plastic pipe, for example, but not limited to, polyvinyl chloride (PVC) pipe to form a bell end with a flared tip on at least one end of the plastic pipe.

Figure 9:
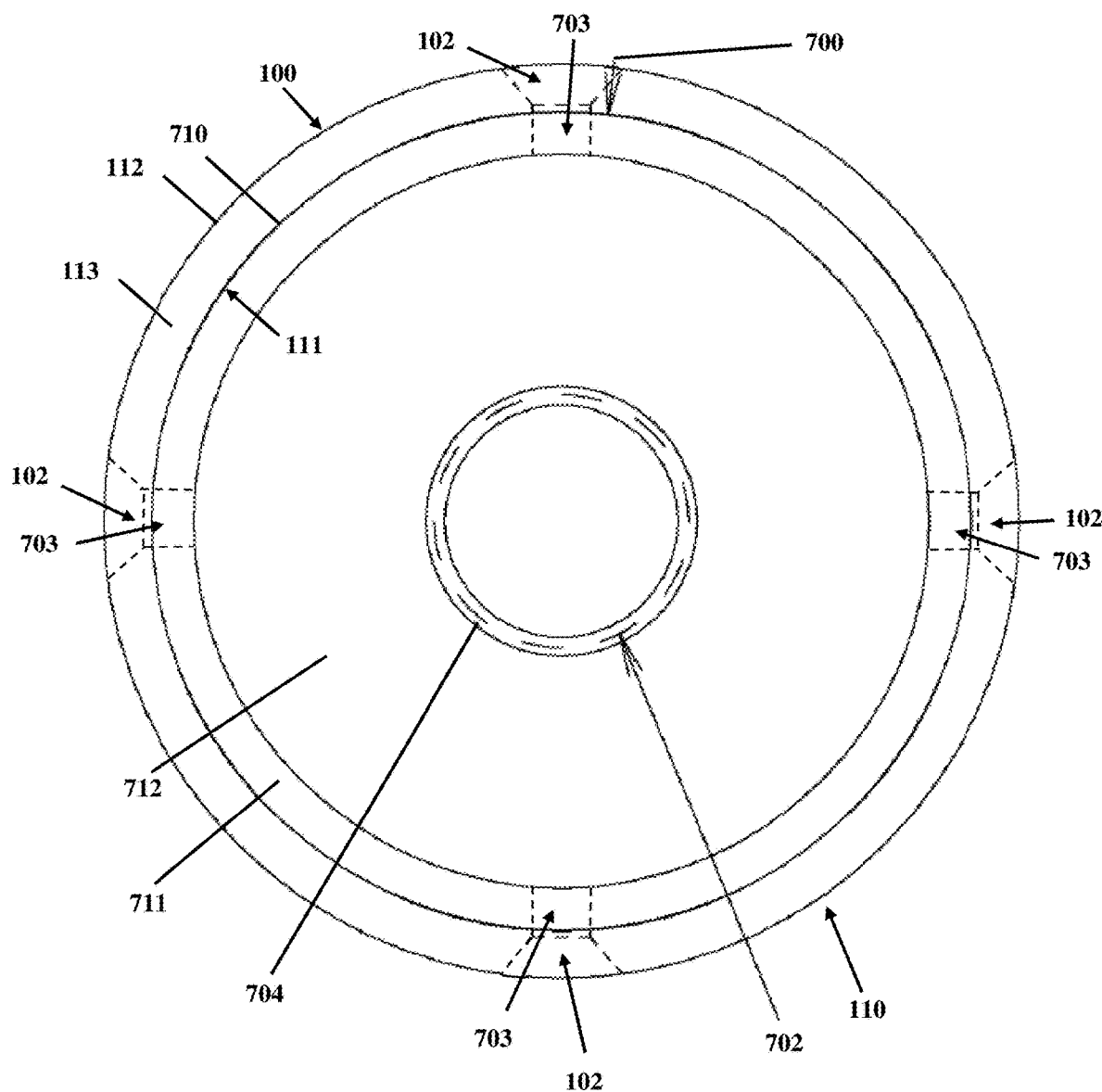
FIG. 9 is a top plan view of FIG. 8 showing the pipe bell-end ring flare device installed around a front end of the mandrel, in accordance with various embodiments of the disclosed subject matter.

FIG. 9 is an top plan view of the pipe bell-end ring flare device 100 installed around and connected to the mandrel 700 of FIG. 7, in accordance with various embodiments of the disclosed subject matter. As seen in FIG. 9, there are 4 recessed fastener openings 102 and threaded openings 703 shown in broken line to illustrate their relative positioning.

Figure 10:
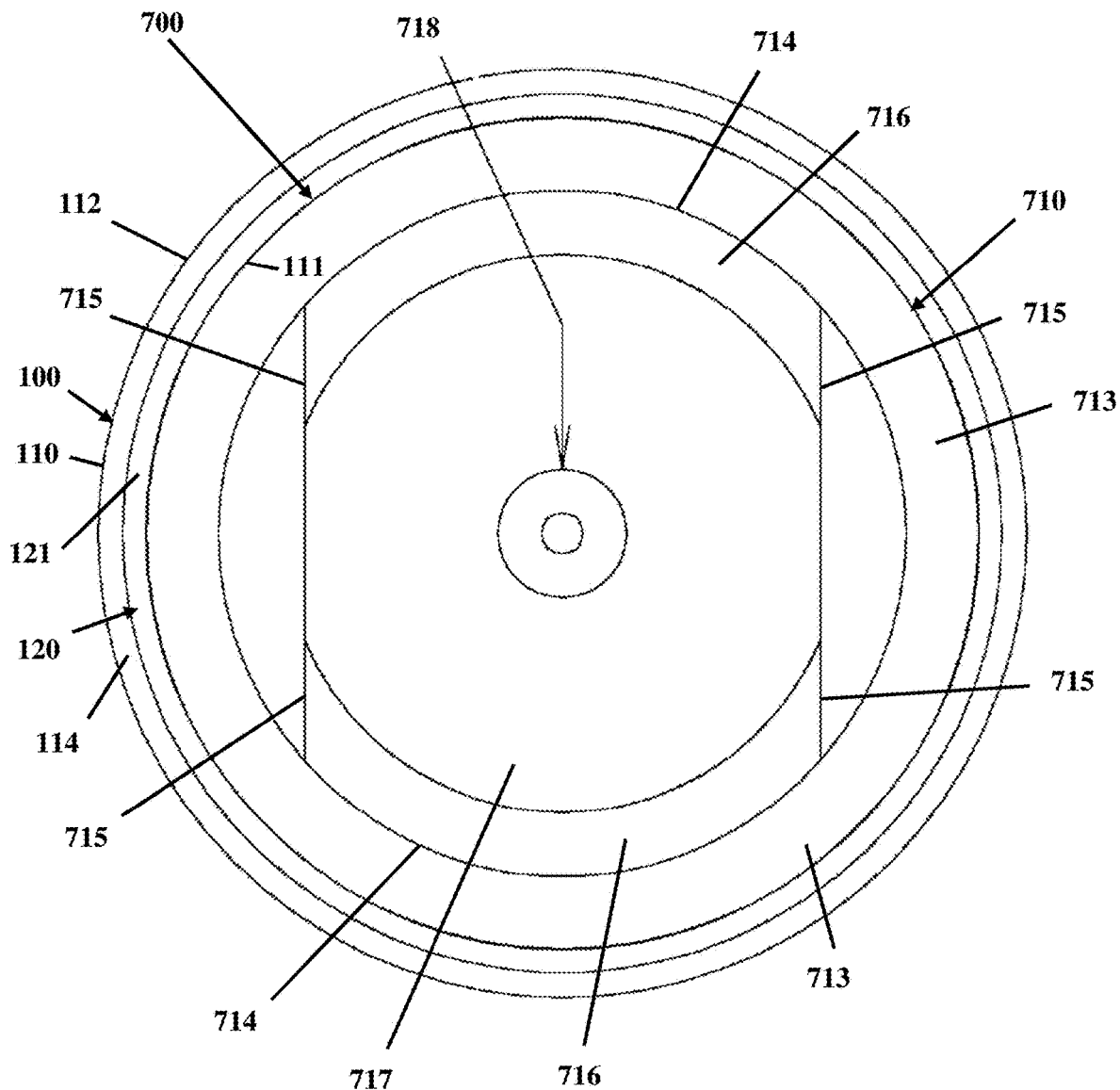
FIG. 10 is a bottom plan view of FIG. 8 showing the pipe bell-end ring flare device installed around a front end of the mandrel, in accordance with various embodiments of the disclosed subject matter.

FIG. 10 is a bottom plan view of FIG. 8 showing the pipe bell-end ring flare device installed around a front end of the mandrel 700, in accordance with various embodiments of the disclosed subject matter. In FIG. 10, the bottom of the pipe bell-end ring flare device 100 is seen positioned around the mandrel 700.

FIG. 11 is a side view of FIG. 7 showing the pipe bell-end ring flare device 100 installed around a front end of the mandrel 700 inserted into an end of a plastic pipe 1110, which is shown in cross-section, in accordance with various embodiments of the disclosed subject matter. In FIG. 11, the plastic pipe 1110 includes a body portion 1112 and a bell end 1114, which has a flared tip 1116. As seen in FIG. 11, the flared tip 1116 is formed against the angled outer circumferential surface 121 of the pipe bell-end ring flare device 100.

FIG. 12 is a flow chart of a method of using the pipe bell-end ring flare device installed around a front end of the mandrel to form a pipe bell end with a flared tip, in accordance with various embodiments of the disclosed subject matter. In FIG. 12, a method 1200 starts 1205, then removably affixes 1210 a pipe bell-end ring flare device to a front end of a mandrel so an angled end of the pipe bell-end ring flare device is away from the front end of the mandrel, and then affixes 1220 the mandrel with the affixed pipe bell-end ring flare device to a support apparatus. For example, but not limited to, a threaded end of the support apparatus with a connecting element having a diameter and a reciprocally-threaded outer circumferential surface to engage with the threaded internal surface 704 of the mandrel opening 702. Optionally, a guide device (not shown) can be inserted into the center drill opening to help ensure that the mandrel with the affixed pipe bell-end ring flare device is coaxially centered in the plastic pipe during the formation process. The method then inserts 1230 the front end of the mandrel with the affixed pipe bell-end ring flare device into an end of a plastic pipe and forms 1240 a bell end with a predefined diameter, length, and a flared tip. The mandrel with the affixed pipe bell-end ring flare device is then removed 1250 from the bell end of the plastic pipe. The method then determines 1260 whether there are additional bell ends to be formed and, if yes there are, then the method loops back to and starts performing step 1230, if no, then the method stops 1265. The method can be used to form bell ends in both ends of a single pipe as well as in only a single end of each pipe.

In the method of FIG. 12, in general, at least a section at an end of a pipe is at a deformation temperature, which is a temperature that is sufficient to enable the pipe to be deformed and shaped using the pipe bell-end ring flare device and which varies with each type of pipe. The pipe can be at a deformation temperature, i.e., a softening point or distortion temperature, which can occur after being initially manufactured or subsequent to being manufactured by heating a predetermined length of an end section of the pipe on which the flared bell-end is to be formed. Temperatures of different plastic pipe types and formulations vary, but, for example, for various types of PVC hardness formulations, the temperatures can range from about 140° to 260° F.

In accordance with various embodiments of the disclosed subject matter, a pipe bell-end ring flare device incudes an upper section including an inner circumferential surface being coaxially aligned with and parallel and opposite to an outer circumferential surface, a top surface orthogonal to each of the inner and outer circumferential surfaces and connected at an inner end of the top surface to a top edge of the inner circumferential surface and connected at an outer end of the top surface to a top edge of the outer circumferential surface, the outer circumferential surface depending downwardly away from the top surface and terminating at a bottom edge, the bottom edge of the outer circumferential surface being connected to an outer bottom edge of a bottom surface, the bottom surface extending orthogonally inwardly toward the coaxially aligned inner circumferential surface, a plurality of equidistantly spaced recessed fastener openings formed around and through the upper section with a recessed portion of each recessed fastener opening being formed in the outer circumferential surface. The pipe bell-end ring flare device further incudes a lower section including a bottom portion of the inner circumferential surface forming a continuous and axially aligned extension of the inner circumferential surface of the upper section, the lower section terminating with a bottom edge of the inner circumferential surface, the bottom edge of the inner circumferential surface being connected to a bottom edge of an upwardly and outwardly extending angled outer circumferential lower surface, a top edge of the upwardly and outwardly extending angled outer circumferential lower surface connected to an inner edge of the bottom surface of the upper section.

In accordance with various embodiments of the disclosed subject matter, an apparatus includes a pipe bell-end ring flare device, which includes an upper section including an inner cylindrical circumferential surface being coaxially aligned with and parallel and opposite to an outer cylindrical circumferential surface, a top surface orthogonal to each of the inner and outer cylindrical circumferential surfaces and connected at an inner end of the top surface to a top edge of the inner cylindrical circumferential surface and connected at an outer end of the top surface to a top edge of the outer cylindrical circumferential surface, the outer cylindrical circumferential surface depending downwardly away from the top surface and terminating at a bottom edge, the bottom edge of the outer cylindrical circumferential surface being connected to an outer bottom edge of a bottom surface, the bottom surface extending orthogonally inwardly toward the axially aligned inner cylindrical circumferential surface, a plurality of equidistantly spaced recessed fastener openings formed around and through the upper section with a recessed portion of each recessed fastener opening being formed in the outer cylindrical circumferential surface. The pipe bell-end ring flare device further includes a lower section including a bottom portion of the inner cylindrical circumferential surface forming a continuous and axially aligned extension of the inner cylindrical circumferential surface of the upper section, the lower section terminating with a bottom edge of the inner cylindrical circumferential surface, the bottom edge of the inner cylindrical circumferential surface being connected to a bottom edge of an upwardly and outwardly extending angled outer cylindrical circumferential lower surface, a top edge of the upwardly and outwardly extending angled outer cylindrical circumferential lower surface connected to an inner edge of the bottom surface of the upper section. The apparatus further includes a mandrel including a proximal end having a first surface with a first cylindrical circumference and a plurality of separate, recessed, and threaded openings formed in the first surface of the proximal end and to which the pipe bell-end ring flare device is fixedly and removably attached, a distal end including an end portion having a second surface with a second cylindrical circumference, and a body portion having a body surface with the first cylindrical circumference and connected at a first end to the proximal end and at a second end to the distal end.

In accordance with various embodiments of the disclosed subject matter, a method of operation includes: a. removably affixing a pipe bell-end ring flare device to a front end of a mandrel so an angled end of the pipe bell-end ring flare device is away from the front end of the mandrel; b. affixing the mandrel with the affixed pipe bell-end ring flare device to a support apparatus; c. inserting the front end of the mandrel with the affixed pipe bell-end ring flare device into an end of a plastic pipe; d. forming a bell end with a predefined diameter and length and a flared tip; and e. removing the pipe bell-end ring flare device and the mandrel from the end of the plastic pipe.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A device comprising:
    an upper section including an inner circumferential surface and an outer circumferential surface, a plurality of equidistantly spaced recessed fastener openings formed around and through the upper section with a recessed fastener head receiving opening portion of each recessed fastener opening being formed in the outer circumferential surface and a coaxially aligned fastener body receiving opening portion of each recessed fastener opening being formed in the inner circumferential surface; and
    a lower section including a bottom portion of the inner circumferential surface forming a continuous and axially aligned extension of the inner circumferential surface of the upper section, an angled outer circumferential lower surface, with a top edge of the angled outer circumferential lower surface connected adjacent to an bottom end of the outer circumferential surface of the upper section.

2. The device of claim 1 wherein the upper section is approximately twice as long as a length of the lower section.

3. The device of claim 1 wherein the upper section is approximately twice a thickness of a top end of the lower section.

4. The device of claim 1 wherein the plurality of equidistantly spaced recessed fastener openings comprises:
    four equidistantly spaced recessed screw openings.

5. The device of claim 4 wherein the four equidistantly spaced recessed screw openings are unthreaded.

6. The device of claim 4 wherein all of the four equidistantly spaced recessed screw openings are various embodiments to receive a screw with a top of a head of the screw positioned flush with or below the outer circumferential surface of the upper section when the screw is fully inserted into the equidistantly spaced recessed screw opening.

7. The device of claim 4 wherein all of the four equidistantly spaced recessed screw openings are various embodiments to align with separate, recessed, and threaded openings formed in an outer surface of a mandrel.

8. The device of claim 1 wherein the angled outer circumferential lower surface extends upwardly and outwardly away from the inner circumferential surface at between 25° to 35°.

9. An apparatus comprising:
    a pipe bell-end ring flare device including:
        an upper section including an inner circumferential surface and an outer circumferential surface, a plurality of equidistantly spaced recessed fastener openings formed around and through the upper section, each of the plurality of equidistantly spaced recessed fastener openings including a recessed fastener head receiving opening portion of each recessed fastener opening being formed in the outer circumferential surface and connected to a coaxially aligned fastener body receiving opening portion formed in the inner circumferential surface; and
        a lower section including a bottom portion of the inner circumferential surface forming a continuous and coaxially aligned extension of the inner circumferential surface of the upper section, and an angled outer circumferential lower surface, with a top edge of the angled outer circumferential lower surface connected adjacent to a bottom end of the outer circumferential surface of the upper section; and a mandrel including a proximal end having a first surface with a first circumference and a plurality of separate, recessed, and threaded openings formed in the first surface of the proximal end with the pipe bell-end ring flare device being fixedly and removably attached via the threaded openings, a distal end of the mandrel including an end portion having a second surface with a second circumference, and a body portion having the first circumference and connected at a first end to the proximal end and at a second end to the distal end.

10. The apparatus of claim 9 wherein the upper section is approximately twice a length of the lower section.

11. The apparatus of claim 9 wherein the upper section is approximately twice a thickness of a top end of the lower section.

12. The apparatus of claim 9 wherein the plurality of equidistantly spaced recessed fastener openings comprises: four equidistantly spaced recessed screw openings.

13. The apparatus of claim 12 wherein the four equidistantly spaced recessed screw openings are unthreaded.

14. The apparatus of claim 12 wherein each of the four equidistantly spaced recessed screw openings is various embodiments to receive a screw where a top of a head of the screw is positioned flush with or below the outer circumferential surface of the upper section when the screw is fully inserted into the equidistantly spaced recessed screw opening.

15. The apparatus of claim 12 wherein each of the four equidistantly spaced recessed screw openings is various embodiments to align with one of the plurality of separate, recessed, and threaded openings formed in the first surface of the proximal end of the mandrel.

16. The apparatus of claim 9 wherein the angled outer circumferential lower surface extends upwardly and outwardly away from the inner circumferential surface at between 25° to 35°.

17. The apparatus of claim 9 wherein the angled outer circumferential lower surface extends upwardly and outwardly away from the inner circumferential surface at approximately 30°.

18. The apparatus of claim 9 wherein the mandrel further comprises a threaded, cylindrical opening formed in a front surface of the proximal end and extending inwardly into the proximal end of the mandrel.

19. A method of operation comprising:
a. removably affixing the apparatus of claim 9 to a support apparatus;
b. inserting a back end of the mandrel with the affixed apparatus into a first end of a plastic pipe;
c. forming a bell end with a predefined diameter, length, and a flared end in the first end of the plastic pipe; and
d. removing the mandrel and the device from the formed bell end of the plastic pipe.

20. The method of operation of claim 19 wherein the plastic pipe is at a temperature to enable the first end of the plastic pipe to deform evenly and form the bell end with the predefined diameter, length, and the flared end.

21. The method of operation of claim 20 wherein a predetermined length of an end of the plastic pipe is heated to at least a predefined plastic pipe softening temperature prior to step b.

22. The method of claim 20 wherein steps b., c., and d. are repeated on one or more subsequent additional plastic pipe ends.

23. The method of claim 19 wherein the affixing the apparatus of claim 9 to the support apparatus comprises engaging a threaded end of the support apparatus into a reciprocally threaded opening formed in a front end of the mandrel.

* * * * *